(12) United States Patent
Tsutaichi et al.

(10) Patent No.: US 7,542,565 B2
(45) Date of Patent: Jun. 2, 2009

(54) FOLDABLE CELLULAR PHONE

(75) Inventors: Fumio Tsutaichi, Akishima (JP); Shinya Yasuda, Akishima (JP); Tatsuya Miyagawa, Hamura (JP); Tohru Tanigawa, Tokorozawa (JP); Katsuhiro Nara, Ota-ku (JP)

(73) Assignee: Casio Hitachi Mobile Communications Co., Ltd, Higashiyamoto-Shi, Tokyo (JP)

( * ) Notice: Subject to any disclaimer, the term of this patent is extended or adjusted under 35 U.S.C. 154(b) by 529 days.

(21) Appl. No.: 11/314,902

(22) Filed: Dec. 20, 2005

(65) Prior Publication Data

US 2006/0177048 A1 Aug. 10, 2006

(30) Foreign Application Priority Data

Dec. 27, 2004 (JP) ............................. 2004-376928

(51) Int. Cl.
*H04M 1/00* (2006.01)
*H04M 9/00* (2006.01)
(52) U.S. Cl. .................. 379/433.13; 379/437; 379/451; 455/575.3
(58) Field of Classification Search ............ 379/433.01, 379/433.11, 433.13, 440, 447, 446, 437, 379/451; 455/575.1, 575.3, 575.8
See application file for complete search history.

(56) References Cited

U.S. PATENT DOCUMENTS

| | | | |
|---|---|---|---|
| 2002/0052137 A1 | 5/2002 | Hayashi et al. | |
| 2003/0114184 A1 | 6/2003 | Wilson | |
| 2004/0001022 A1 | 1/2004 | Silzer, Jr. | |
| 2004/0180706 A1 | 9/2004 | Pan | |
| 2005/0075082 A1 | 4/2005 | Iwai et al. | |

FOREIGN PATENT DOCUMENTS

| | | |
|---|---|---|
| EP | 1 388 910 | 2/2004 |
| EP | 1 388 910 A2 | 2/2004 |
| JP | 05-037617 | 2/1993 |
| JP | 11-192115 | 7/1999 |
| JP | 11-308311 | 11/1999 |
| JP | 2000-174874 | 6/2000 |
| JP | 2000-261535 | 9/2000 |
| JP | 2002-135385 | 5/2002 |
| JP | 2004-111862 | 4/2004 |
| WO | WO 03/001355 A1 | 1/2003 |
| WO | WO 03/064145 A2 | 8/2003 |

OTHER PUBLICATIONS

Office Action (with English translation) dated Jan. 25, 2008 issued for the Chinese Patent Application No. 2005101363893.

*Primary Examiner*—Curtis Kuntz
*Assistant Examiner*—Tuan D Nguyen
(74) *Attorney, Agent, or Firm*—Cohen Pontani Lieberman & Pavane LLP

(57) ABSTRACT

A foldable cellular phone with a plastic housing having an operation section and a plastic housing having a main display section that are joined by a hinge on one end side to freely open and close, comprising an impact resistant handle composed of elastic material protruded and formed on the opposite side end from the hinge of the housing having the main display section; a connector cover composed of elastic material protruded and formed on the opposite side end from the hinge of the housing having the operation section; and a hinge cover composed of elastic material formed on a protrudent portion from the hinge of both housing ends when both housings are in a folded state.

7 Claims, 5 Drawing Sheets

FIG. 4A
FIG. 4B
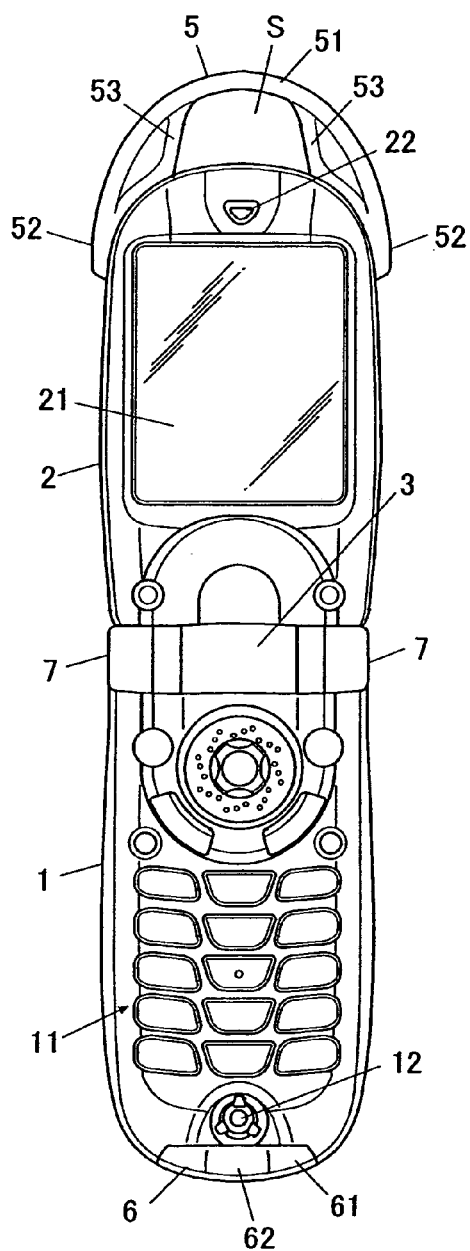
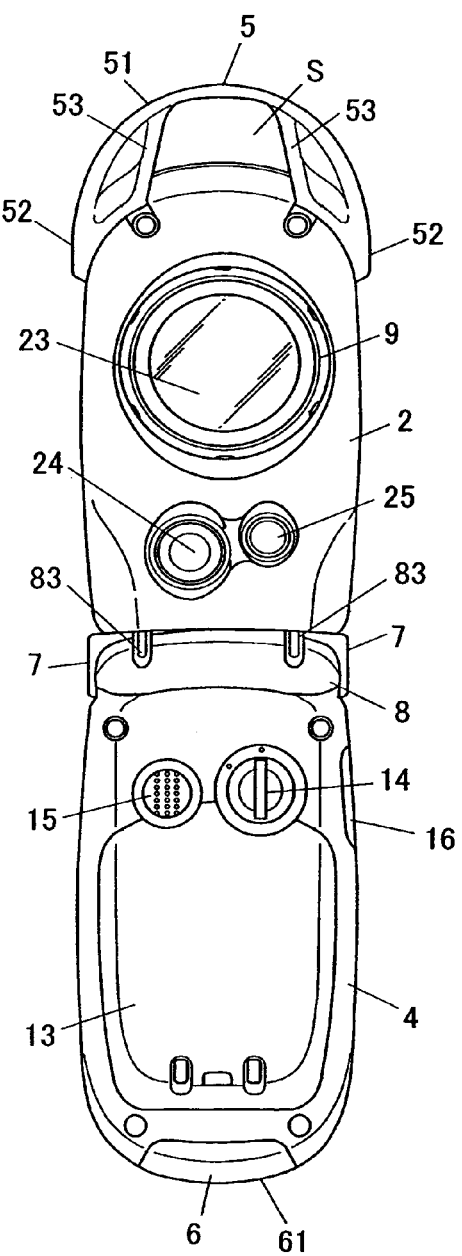

FOLDABLE CELLULAR PHONE

CROSS-REFERENCE TO RELATED APPLICATION

This application is based upon and claims the benefit of priority from the prior Japanese Patent application No. 2004-376928, filed Dec. 27, 2004, the entire contents of which is incorporated herein by reference.

BACKGROUND OF THE INVENTION

1. Field of the Invention

The present invention relates to a foldable cellular phone with an impact resistant structure.

2. Description of the Related Art

A non-foldable cellular phone configuration consisting of one housing, for example, as disclosed in Japanese Laid-Open (Kokai) Patent Application No. 2000-174874 titled "PROTECTOR FOR PORTABLE TELEPHONE SET," has corner protection sections, side surface protection sections and display protection sections. These protectors are integrally formed by an elastic material attached to absorb impacts, such as from dropping.

However, in a foldable cellular phone such consideration to protect the peripheral surface does not exist.

Specifically, as for a foldable cellular phone, there is an opened state and a closed state, thus both of these states must be taken into consideration with regard to an impact from dropping, etc. However, since conventional prior art has not addressed this issue and a foldable type cellular phone was not anticipated in the disclosed technique of the above-mentioned JP 2000-174874, there is a point at issue that consideration of an impact resistant structure has not been sufficiently addressed.

SUMMARY OF THE INVENTION

The object of the present invention is to provide a foldable cellular phone capable of absorbing an impact even if in an opened or a closed (folded) state.

In order to achieve the above-mentioned object, the present invention provides a foldable cellular phone with a housing having an operation section and a housing having a display section that are joined by a hinge on one end side to freely open and close, comprising an impact resistant handle composed of elastic material protruded and formed on the opposite side end from the hinge of the housing having the display section; a connector cover composed of elastic material protruded and formed on the opposite side end from the hinge of the housing having the operation section; and a hinge cover composed of elastic material formed on a protrudent portion from the hinge of both housing ends when both housings are in a folded state.

In accordance with the present invention, when the foldable cellular phone is dropped with both housings in an opened state, the direct impact to the housing can be readily absorbed even if dropped on whichever end side by the elastic material of the impact resistant handle which protrudes from the end of the housing having the display section and the elastic material of the connector cover which protrudes from the end of the housing having the operation section.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 1A is a top view showing the folded state, FIG. 1B is a side view and FIGS. 1C and 1D are end views;

FIG. 4A is a top view showing the operation section as well as the display section and FIG. 4B is a bottom view which illustrate the opened state for the foldable cellular phone of FIGS. 1A~1D.

DETAILED DESCRIPTION OF THE PREFERRED EMBODIMENTS

Figure 1D:
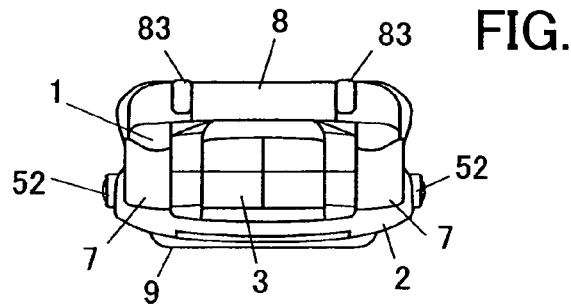
FIGS. 1A~1D are configuration examples showing one preferred embodiment of the foldable cellular phone applied to the present invention. Notably.
Figure 1A:
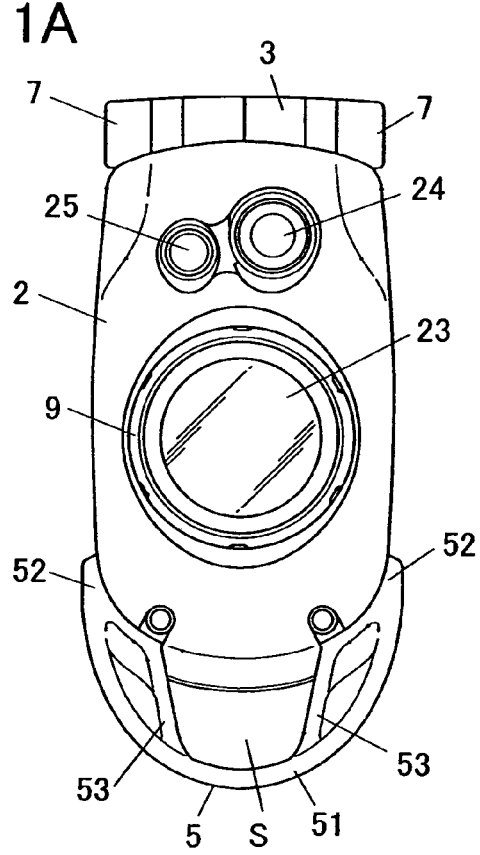
Figure 1B:
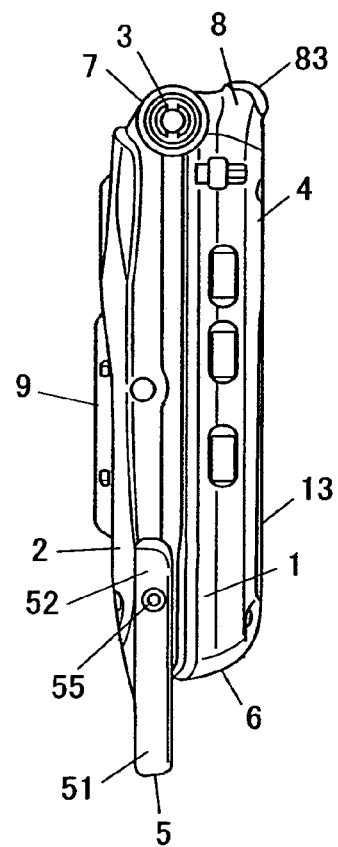
Figure 1C:
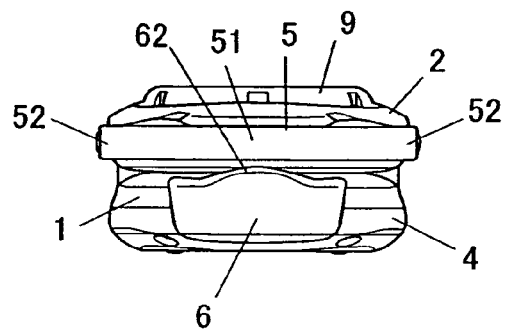

Hereinafter, the preferred embodiments of the present invention will be described in detail with reference to the drawings.

A. Configuration

FIGS. 1A~5B show an example of one configuration of the foldable cellular phone as applied to the present invention. A lower housing 1 comprises an operation section 11, a microphone 12, a battery 13, a battery lock knob 14, a speaker 15 and an earphone cover 16. An upper housing 2 comprises a main display section 21, a receiver 22, a sub-display section 23, a camera lens section 24 and a flash light section 25. Furthermore, the present invention comprises a hinge 3, a hinge unit 31, a lower cover 4, an impact resistant handle 5, a connector cover 6, a hinge cover 7, an antenna cover 8 and a sub-display perimeter frame.

The example diagrams are of the foldable cellular phone in which the lower housing 1 and the upper housing 2 composed of all plastic are joined by the hinge 3 on one end side for opening and closing.

The lower housing 1 is formed with the operation section 11 having various manipulation keys and the microphone 12 (Refer to FIGS. 4A~4B) on the inner side surface which overlaps with the upper housing 2 in a folded state. The battery 13, the battery lock knob 14 and the speaker 15 (Refer to FIGS. 2A~2B and FIGS. 4A~4B) are formed on the outer side surface of the opposite side. Also, the earphone cover 16 is formed on one side surface of the lower housing 1.

The upper housing 2 is formed with the main display section 21 and the receiver 22 (Refer to FIGS. 4A~4B) on the inner side surface which overlaps with the housing 1 in a folded state. The circular sub-display section 23, the camera lens section 24 and the flash light section 25 (Refer to FIGS. 1A~1D, FIG. 3 to FIGS. 5A~5B) are respectively form on the outer side surface of the opposite side.

Figure 2A:
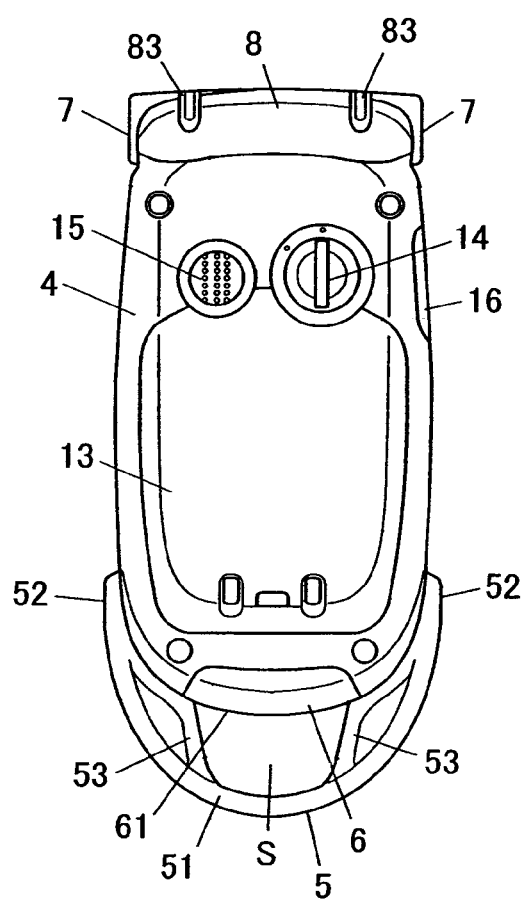
FIG. 2A is a bottom view of the foldable cellular phone in the folded state and FIG. 2B is a side view.
Figure 2B:
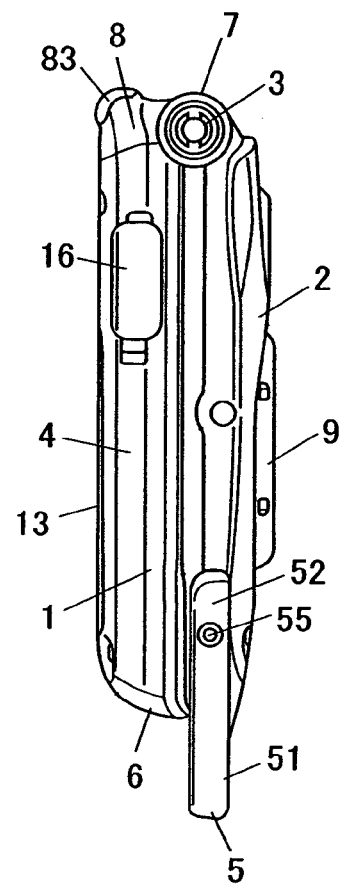
Figure 3:
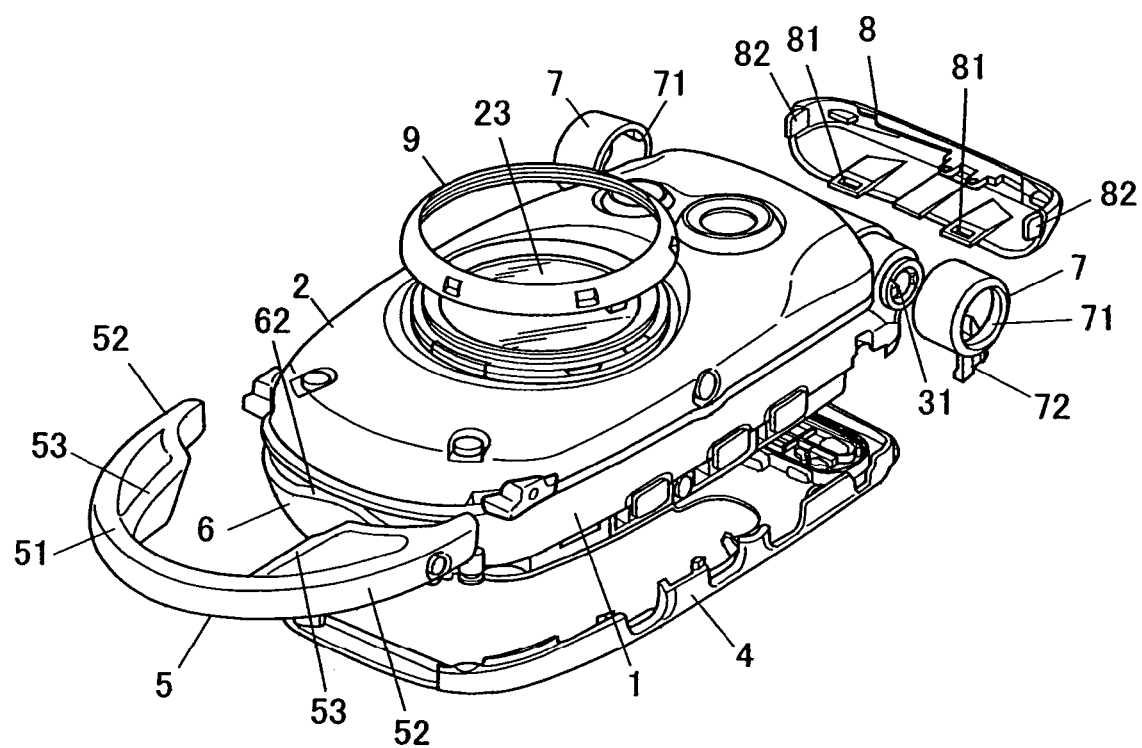
FIG. 3 is a perspective diagram showing the shock-absorbing material disassembled from both housings and illustrates the folded state for the foldable cellular phone of FIGS. 1A~1D.
Figure 5A:
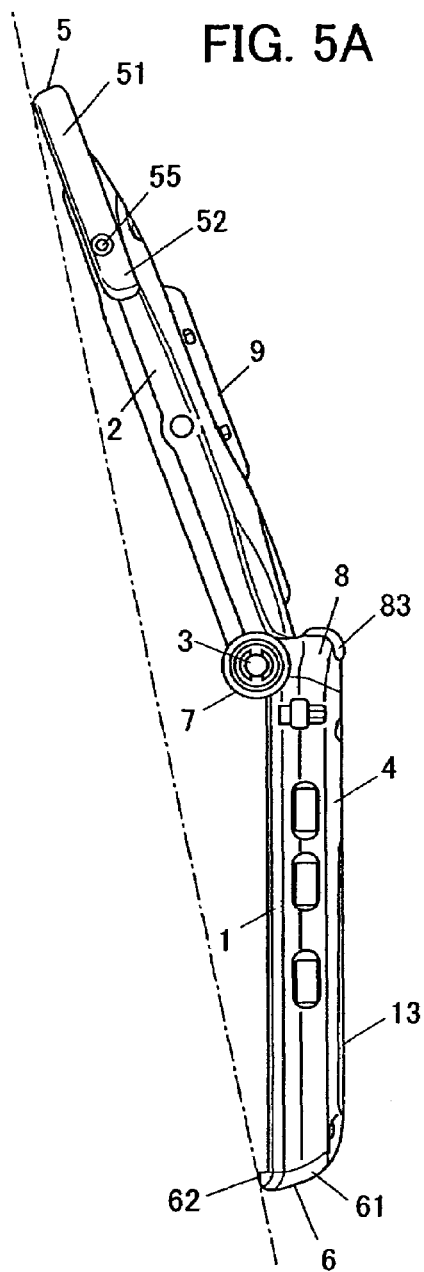
FIG. 5A is a side view of the foldable cellular phone in the opened state of FIGS. 4A~4B and FIG. 5B is a diagram as observed from the upper side.
Figure 5B:
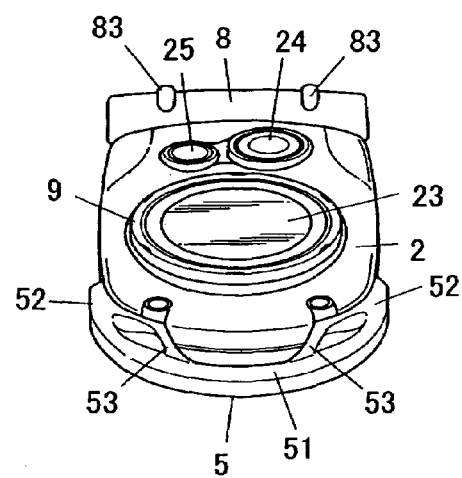

The above-mentioned foldable cellular phone is equipped with the bottom cover 4, the impact resistant handle 5, the connector cover 6, the hinge cover 7, the antenna cover 8 and the sub-display section perimeter frame 9 which are made from an elastomer of elastic material, respectively, as shock absorbing material for impact resistance whenever dropped, etc. The lower cover 4 formed with an elastomer covers the bottom surface of the lower housing 1 and substantially the bottom half of both side surfaces. As shown in FIGS. 2A~2B and FIG. 3, the lower cover 4 is attached with screws on the outer side surface of the lower housing 1. Also, the lower cover 4 has an opening encircling the battery 13, the battery lock knob 14 and the speaker 15.

The impact resistant handle 5 is made from elastomer and constituted by integrally molding an arch-shaped part 51 and an inward rib-shaped extension part 53 from both sides of the left and right ends 52. Furthermore, the impact resistant handle 5 is attached with screws on the opposite side end from the hinge 3 of the upper housing 2 as seen in the drawings. Namely, the impact resistant handle 5 resembles an R-shaped portion on the opposite side edge toward the hinge 3 of the upper housing 2 and has an opened space S in between the arch-shaped part 51. The left and right inward extension part 53 of the arch-shaped part 51 is applied to the R-shaped portion of the upper housing 2 and mounted by fastening both ends 52 of the arch-shaped part 51 to both side surfaces of the R-shaped portion with a screw 55, respectively.

Accordingly, provision of the impact resistant handle 5 allows carrying of the foldable cellular phone in a suspended manner by the user placing their fingers through the impact resistant handle 5. Furthermore, the impact resistant handle 5 is removably attachable and mounted with screws to the upper housing 2. In this manner, a plurality of impact resistant handle types can be optionally selected and changed by the user.

The connector cover 6 is molded with an elastomer. The connector cover 6 is attached to a connector opening where an exposable communication connector (not shown) is formed within the opposite side end from the hinge 3 of the lower housing 1.

Although not shown, more specifically, the connector cover 6 covers the connector opening. Either the left or right end is attached to freely open and close by a hinge coupling within the connector opening of the lower housing 1. The opposite end can be secured within the connector opening of the lower housing 1.

As shown in FIG. 4A and FIG. 4B, the connector cover 6 is formed in an R-shaped portion 61 which slightly protrudes with the end of the lower housing 1. As shown in FIG. 1A~1D, from FIG. 3 to FIG. 5A~5B, the central part of the connector cover 6 is a protrusion 62 which projects out in a small R-shape from the inner side surface of the lower housing 1.

The hinge cover 7 is constituted by integrally molding a locking part 72 to a portion of a ring-shaped part 71 made from an elastomer and formed on both sides of the hinge 3 as seen in the drawings. Namely, as shown in FIGS. 1A~1D and from FIG. 3 to FIGS. 5A~5B, the hinge 3 is situated so as to protrude from the edge of the lower housing 1 and as the upper housing 2. Furthermore, the rotation center of the hinge 3 is situated in the upper housing 2 side. The hinge cover 7 is mounted to the ring-shaped part 71 attached to the outer side of the hinge unit 31 ends on both sides with the locking part 72 latched to the lower housing 1, respectively.

The antenna cover 8 is molded with elastomer and attached to antenna openings where an antenna (not shown) is inserted exposed and formed within the end of the hinge 3 side of the lower housing 1. As shown in the drawings, the antenna cover 8 is shaped to cover the antenna openings containing the outer side surface and both side surfaces at the end of the lower housing 1. Also, a left-right pair of latching tabs 81 and 82 protrudes to the inner side and latch in the antenna openings of the lower housing 1, respectively.

On the outer surface of the antenna cover 8, a pair of protrusions 83 are formed which protrude in a small rib-like shape. Also, a pair of protrusions 83 protrudes in a small rib-like shape on the outer surface of the lower housing 1.

The sub-display section perimeter frame 9 is molded with an elastomer and is formed in a ring-shape as shown in the drawings which encloses the sub-display section 23 and affixed to the outer side surface of the upper housing 2 by adhesion.

In the above-mention foldable cellular phone, the opening angle of the lower housing 1 and the upper housing 2 is regulated to be less than 180 degrees by a hinge unit, not shown, constituting the hinge 3.

B. Operational Effect

Next, the operational effect of the foldable cellular phone equipped with the above-mentioned shock-absorbing material, namely, the lower cover 4, the impact resistant handle 5, the connector cover 6, the hinge cover 7, the antenna cover 8 and the sub-display section perimeter frame 9 made from an elastomer will be explained.

B-1. Folded State

"In the case of being dropped while both housings 1 and 2 are in the folded state" (Refer to FIGS. 1A~1D and FIGS. 2A~2B).

First, in the event that the cellular phone is dropped and the lower housing 1 is impacted, the direct impact against the lower housing 1 is absorbed and mitigated by the elastic function of the lower cover 4 which covers the bottom surface of the lower housing 1 and substantially the lower half of both side surfaces.

Also, in the event that the cellular phone is dropped and the upper housing 2 is impacted, the direct impact against the upper housing 2 and the sub-display section 23 is absorbed and mitigated by the elastic function of the ring-shaped sub-display section perimeter frame 9 formed on the outer surface of the upper housing 2.

In the event that the cellular phone is dropped and the opposite side from the hinge 3 is impacted, the direct impact against the upper housing 2 is absorbed and mitigated by the elastic function of the impact resistant handle 5 which protrudes from the end of the upper housing 2 and contains the arch-shaped part 51 as well as the inward rib-shaped extension part 53 on both sides.

In addition, a direct impact against the lower housing 1 is also absorbed and mitigated by the elastic function of the connector cover 6 containing the R-shaped portion 61 which protrudes from the end of the lower housing 1.

Besides, in the event that the cellular phone is dropped and the hinge 3 is impacted, the direct impact against the hinge unit 31 ends and both housings 1 and 2 is absorbed and mitigated by the elastic function of the ring-shaped part 71 of the hinge cover 7 formed on the hinge unit 31 ends which protrude from both of the housing 1 and 2 edges.

Further, the direct impact against the lower housing 1 will also be absorbed and mitigated by the elastic function of the antenna cover 8 and either side rib-shaped protrusions 83, which protrude from the opposite side surface of the lower housing 1 toward the hinge 3.

Furthermore, in the event that the cellular phone is dropped sideways and the impact resistant handle 1 side is impacted, the direct impact against the upper housing 2 is absorbed and mitigated by the elastic function of its arch-shaped part 51 and both side ends 52. Finally, in the event that the cellular phone is dropped sideways and the hinge 3 side is impacted, the direct impact against the hinge unit 31 end and both of the housings 1 and 2 is absorbed and mitigated by the elastic function of the ring-shaped part 71 of the hinge cover 7.

B2. Opened State

"In the case of being dropped while both housings 1 and 2 are in the opened state (unfolded)" (Refer to FIGS. 4A~4B and FIGS. 5A~5B).

First, in the event that the cellular phone is dropped and the lower housing 1 is impacted while in an opened state within the maximum regulated opened angle of less than 180 degrees, the direct impact against the lower housing 1 is absorbed and mitigated in a manner similar to the circumstances of the folded state with the lower cover 4.

Also, in the event that the cellular phone is dropped and the upper housing 2 is impacted, the direct impact against the upper housing 2 and the sub-display section 23 is absorbed and mitigated by the elastic function of the ring-shaped sub-display section perimeter frame 9 which is similar to the circumstances of the folded state.

In the event that the cellular phone is dropped and the connector cover 6 is impacted, the direct impact against the lower housing 1 is absorbed and mitigated by the elastic function of the connector cover 6 containing the R-shaped portion 61. Also, in the event that the cellular phone is dropped and the impact resistant handle 5 is impacted, the direct impact against the upper housing 2 is absorbed and mitigated by the elastic function the arch-shaped part 51 and the inward rib-shaped extension part 53 on both sides.

Furthermore, in the event that the cellular phone is dropped and the antenna cover 8 is impacted in an opened state within the maximum regulated opened angle of less than 180 degrees, the direct impact against the lower housing 1 is absorbed and mitigated by the elastic function the antenna cover 8 and the rib-shaped protrusions 83 on both sides. In addition, in the event that the cellular phone is dropped and the hinge 3 (antenna cover 8) side is impacted on the left or right side direction, the direct impact against the hinge 3 and both housings 1 and 2 is absorbed and mitigated by the elastic function the ring-shaped part 71 of the hinge cover 7.

In the event that the cellular phone is dropped and the opened side is impacted while in an opened state within the maximum regulated opened angle of less than 180 degrees, the direct impact against the upper housing 2, the main display section 21 and the receiver 22 is absorbed and mitigated by the impact resistant handle 5 containing the arch-shaped part 51 and the inward rib-shaped extension part 53 on both sides. Also, a direct impact against the lower housing 1, the operation section 11 and the microphone 12 is absorbed and mitigated by the elastic function the connector cover 6 containing the R-shaped portion 61 and the protrusion 62.

In particular, an impact with the connector cover 6 is effectively absorbed and mitigated by the protrusion 62 from the inner side surface of the lower housing 1.

In addition, in the event that the cellular phone is dropped sideways and the impact resistant handle 5 is impacted, the direct impact against the upper housing 2 is absorbed and mitigated by the arch-shaped part 51 and the inward rib-shaped extension part 53 on both sides.

Moreover, in the above-mentioned preferred embodiment, although the effects of impact resistant cushioning at the time of unintentional dropping the cellular phone have been explained, it is also possible to obtain the stated effects of impact resistant cushioning which derive from not only dropping but caused by other external forces as well.

Also, in the preferred embodiment, the antenna cover made with an elastomer is formed in the lower housing hinge side edge. In addition, it is also possible to substitute a cover made with an elastomer in the upper housing hinge side edge.

Finally, the shape of the cellular phone and the shock-absorbing material of namely, the housings, the hinge member, the lower cover, the impact resistant handle, the connector cover, the hinge cover, the antenna cover and the sub-display section perimeter frame are discretionary and not limited to the preferred embodiment. In addition, the present invention with regard to construction details including the detailed mounting structure may be suitably changed.

While the present invention has been described with reference to the preferred embodiments, it is intended that the invention be not limited by any of the details of the description therein but includes all the embodiments which fall within the scope of the appended claims.

What is claimed is:

1. A foldable cellular phone having in its folded state first and second opposed end sides and first and second opposed lateral sides, with a first housing having an operation section and a second housing having a main display section that are joined by a hinge on the first end side to freely open and close, comprising:
    an impact resistant handle comprising elastic material and protruding from the housing, the handle being formed on the second housing having the main display section at the second opposed end side opposite the hinge and protruding from the first and second opposed lateral sides of the second housing;
    a connector cover comprising elastic material, the connector cover protruding from and being formed on the first housing having the operation section at the second end side opposite the hinge; and
    a hinge cover comprising elastic material formed on a portion protruding from the hinge on the lateral sides and the end sides of the first and second housings when the first and second housings are in the folded state.

2. The foldable cellular phone according to claim 1, wherein the impact resistant handle protrudes from an end of both housings in the folded state.

3. The foldable cellular phone according to claim 1, wherein an opened angle of both housings is regulated to be less than 180 degrees; and
    wherein the impact resistant handle and the connector cover respectively protrude toward extension of the housings when in the opened state.

4. The foldable cellular phone according to claim 1, wherein the impact resistant handle is affixed removably attachably to the housing.

5. The foldable cellular phone according to claim 1, wherein the connector cover also protrudes from a surface of the operation section of the first housing.

6. The foldable cellular phone according to claim 1, further comprising:
    a sub-display section formed on a first surface opposite a second surface of the second housing having the main display section; and
    a perimeter frame comprising elastic material protruding from and formed on a periphery of a sub-display.

7. The foldable cellular phone according to claim 1, further comprising a lower cover comprising elastic material protruding from a surface opposite the hinge and formed on an end hinge side of at least one of the first and second housings.

* * * * *